United States Patent
Braun et al.

(10) Patent No.: US 9,746,079 B2
(45) Date of Patent: Aug. 29, 2017

(54) SEALING DEVICE OF A LASER MACHINING HEAD

(75) Inventors: Jens Braun, Gerlingen (DE); Dominik Vees, Tuebingen (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 2078 days.

(21) Appl. No.: 11/865,497

(22) Filed: Oct. 1, 2007

(65) Prior Publication Data

US 2008/0079223 A1    Apr. 3, 2008

(30) Foreign Application Priority Data

Sep. 29, 2006 (EP) .................................. 06 020 566

(51) Int. Cl.
| | |
|---|---|
| *B23K 26/14* | (2014.01) |
| *F02F 11/00* | (2006.01) |
| *G01C 15/02* | (2006.01) |
| *F16J 15/08* | (2006.01) |
| *F16J 15/04* | (2006.01) |

(52) U.S. Cl.
CPC ........ *F16J 15/0887* (2013.01); *B23K 26/1462* (2015.10); *F16J 15/04* (2013.01)

(58) Field of Classification Search
CPC ..... B23K 26/1462; F16J 15/04; F16J 15/0887
USPC ... 219/121.67, 121.6, 121.22, 121.39, 121.4, 219/121.5; 277/593; 33/293, 297, 299, 33/DIG. 2, 533, 613, 645, 573, 347
See application file for complete search history.

(56) References Cited

U.S. PATENT DOCUMENTS

| | | | | | |
|---|---|---|---|---|---|
| 3,543,407 | A | * | 12/1970 | Dega | ............................... 33/613 |
| 4,467,171 | A | * | 8/1984 | Ramos | ...................... 219/121.67 |
| 4,782,496 | A | * | 11/1988 | Couturier | ...................... 372/109 |
| 5,128,508 | A | * | 7/1992 | Klingel | ................... 219/121.67 |
| 5,209,502 | A | * | 5/1993 | Savoia | .......................... 277/562 |
| 5,321,228 | A | | 6/1994 | Krause et al. | |
| 6,219,931 | B1 | * | 4/2001 | Roth | ............................... 33/645 |
| 6,830,641 | B2 | * | 12/2004 | Kosty et al. | ................. 156/221 |

(Continued)

FOREIGN PATENT DOCUMENTS

| | | | |
|---|---|---|---|
| CN | 200954575 Y | * | 10/2007 |
| DE | 4326254 | | 2/1995 |
| DE | 9421369 | | 10/1995 |

(Continued)

OTHER PUBLICATIONS

CN200954575Y—description.pdf machine translation.*
Search Report from corresponding European Application Serial No. 06020566.3; mailed Mar. 8, 2007.

*Primary Examiner* — Quang D Thanh
*Assistant Examiner* — Ket D Dang
(74) *Attorney, Agent, or Firm* — Fish & Richardson P.C.

(57) ABSTRACT

An integrated sealing device of a laser machining head for sealing between a hollow cage member and a conduit of the laser machining head is described. The hollow cage member includes a first contact surface and a first opening therethrough. The first contact surface includes a substantially planar portion and an elastically deformable sealing lip extending therefrom. The conduit includes a second contact surface and a second opening therethrough. The sealing lip of the first contact surface is configured to contact the second contact surface to form a seal between the hollow cage member and the conduit.

20 Claims, 2 Drawing Sheets

(56) References Cited

U.S. PATENT DOCUMENTS

2003/0178792 A1 * 9/2003 Pridmore ............... 277/628

FOREIGN PATENT DOCUMENTS

| EP | 411535 A2 * | 2/1991 | ............. B23K 26/00 |
| GB | 1 477 710 | 6/1977 | |
| JP | 57047595 A * | 3/1982 | ............. B23K 26/14 |

* cited by examiner

SEALING DEVICE OF A LASER MACHINING HEAD

RELATED APPLICATION

Under 35 U.S.C. §119, this application claims the benefit of a foreign priority application filed in Europe, serial number EP 06 020 566.3, filed Sep. 29, 2006, which is incorporated herein in its entirety.

TECHNICAL FIELD

This invention relates to a sealing device of a laser machining head for sealing between two components of the laser machining head.

BACKGROUND

The use of separate sealing devices ("seals") between components in a laser machining head is generally known. Such seals are normally elastomeric seals such as O rings. However, it has been shown in practice that the use of separate seals has not proven satisfactory in the removal and subsequent re-assembly of the laser machining head in maintenance work. Either the old seal, which in most cases is no longer intact, is nevertheless re-used, or left out entirely. It may also be the case that a new seal is installed incorrectly. Elastomeric seals have the added disadvantage that the thermal loading capacity of such seals is rather low.

In some cases, components with flat surfaces are used to avoid the need for separate sealing devices.

With laser cutting heads in particular, an insulator of a capacitively insulating material, such as ceramic, of a sensor device, must be connected to a metal component of the laser cutting head in a largely gas-tight, releasable manner. Such a sensor device is disclosed, for example in DE19906442, which is incorporated in its entirety herein by reference. The sealing action between the metal surface and the ceramic surface is dependent on the surface condition of the surfaces (flatness and roughness). A sealing action without a separate seal is difficult to achieve in this case.

SUMMARY

In one aspect of the invention, in a two-component sealing device, one component has an elastically deformable sealing lip. The stringent demands imposed on the sealing surfaces of the components may then be reduced to a minimum so that costs can be saved in production, particularly in grinding the sealing surfaces. These advantages are particularly noticeable when one component is to be produced from a capacitively insulating material, which as ceramic or plastics, which are expensive to machine, and the other is to be produced from metal.

If one component has a sealing lip which projects from the contact surface of this component in the direction of the other component, the deformation of the sealing lip has an extremely good sealing effect.

If an annular recess or notch is located over the sealing lip in the component, the resilience of the sealing lip is increased. The sealing lip has extremely good spring contact and/or elastic deformation.

If the sealing lip has an annular contact surface or contact edge for the counter-surface (or contact surface) of the second component, this is sufficient for machining this counter-surface to a high quality. Production cost is therefore reduced as a result of the reduced area of the second component that requires machining.

In one aspect, the invention is a sealing device that is simple in structure, low cost, and reliable.

An exemplary embodiment of the invention is represented diagrammatically in the drawing and is explained in greater detail in the following with reference to the figures in the drawing.

DETAILED DESCRIPTION

Figure 1:
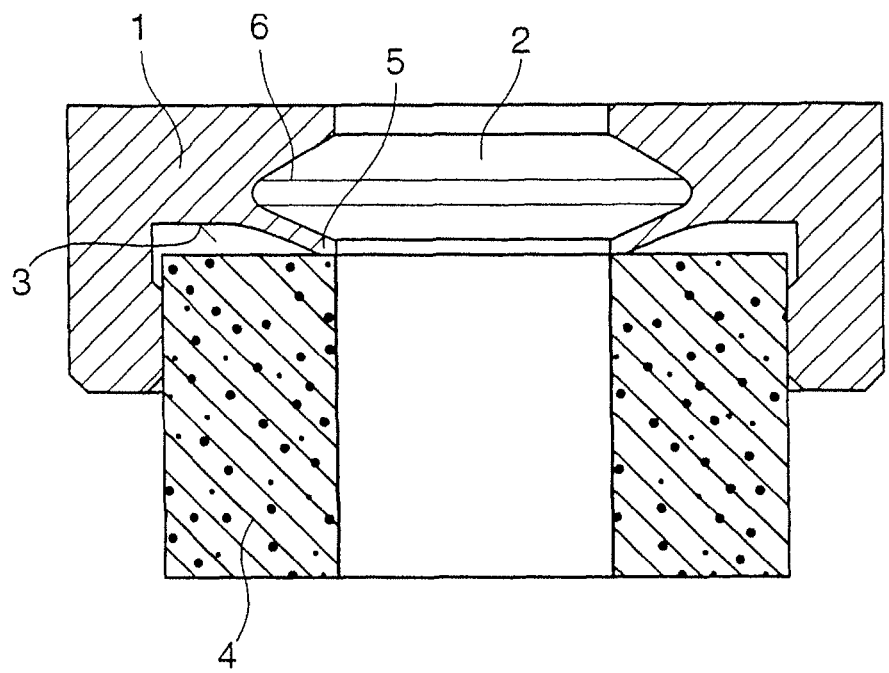
FIG. 1 shows a simplified explanatory representation of a sealing device according to the invention before final assembly of the laser machining head and before laser machining.

FIG. 1 shows that a first component 1 of a laser machining head, produced from metal, has a through hole 2 for the laser beam and a machining gas. In some embodiments, component 1 is a hollow cage member. Furthermore, component 1 has a contact surface 3 for a second component 4, a ceramic insulator, which is also provided with a through hole. In some embodiments, component 4 is a ceramic conduit. Components 1 and 4 must be connected in a gas-tight manner. A sealing lip 5, which constitutes part of the contact surface 3 for insulator 4, is therefore formed on component 1. Sealing lip 5 is integrated in component 1. In some embodiments, sealing lip 5 extends from a substantially planar portion of contact surface 3. An edge region of through hole 2 is provided with a notch or recess 6 so that sealing lip 5 has an elasticity. For sealing against insulator 4, sealing lip 5 projects beyond a substantially planar portion of contact surface 3 in the direction of insulator 4. FIG. 1 shows the condition of sealing lip 5 before deformation. Insulator 4 bears lightly against sealing lip 5. Sealing lip 5 may be forced upwards.

Figure 2:
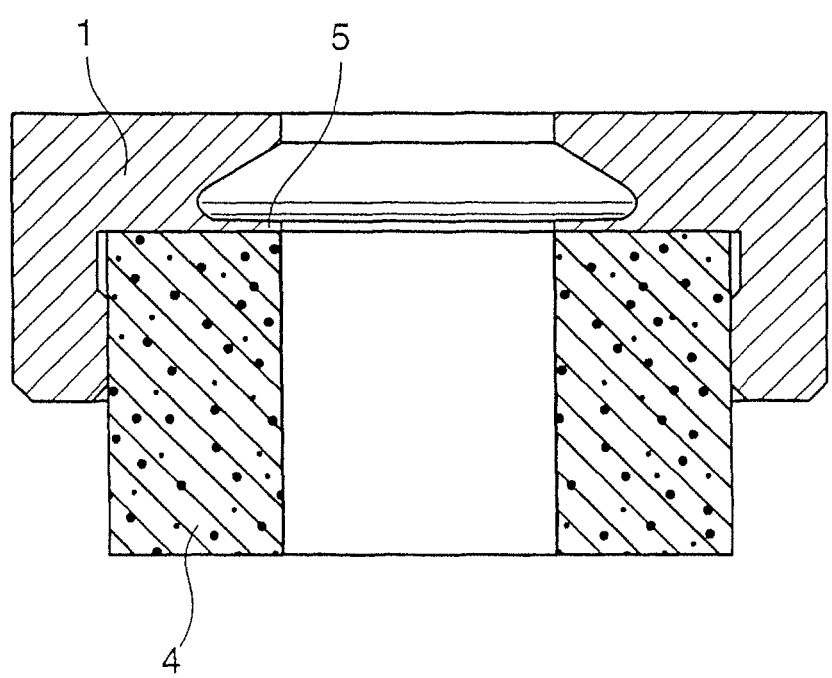
FIG. 2 shows a simplified explanatory representation of the sealing device according to FIG. 1 after final assembly of the laser machining head and during laser machining.

As shown in FIG. 2, components 1 and 4 are forced together so that sealing lip 5 is deformed. It can be seen that sealing lip 5 is designed so that it only seals on a small definable annular surface. Components 1 and 4 are now connected in a gas-tight manner.

Figure 3:
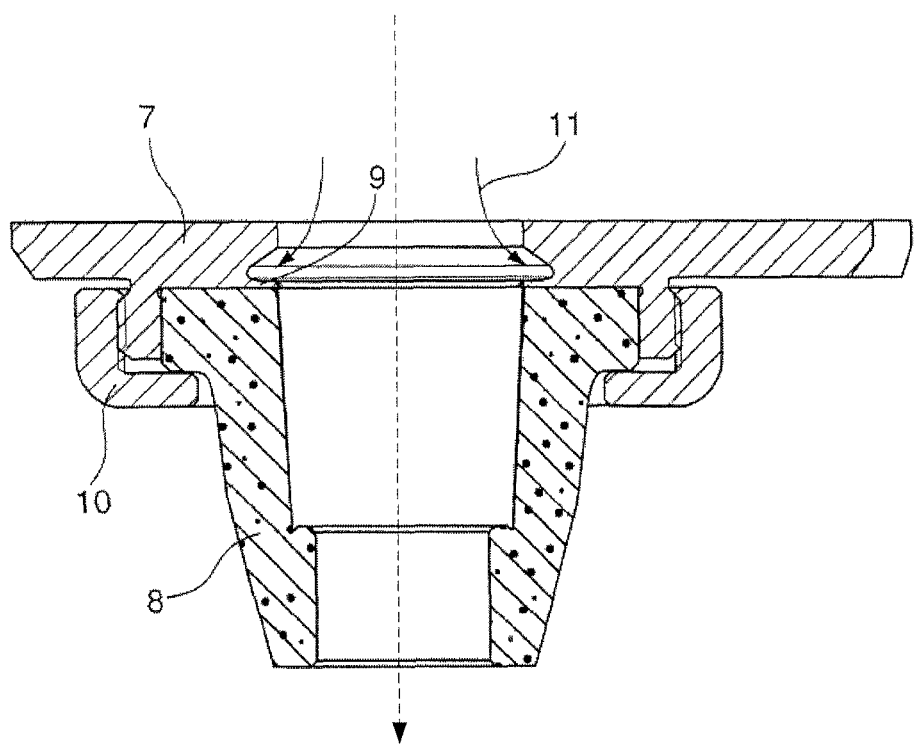
FIG. 3 shows components of a laser machining head after assembly in longitudinal section.

FIG. 3 shows a specific exemplary embodiment. A first component 7 of a laser cutting head is connected to an insulator 8 in a gas-tight manner. Component 7 may be fastened to additional elements of the laser cutting machine. A laser cutting nozzle can be received on the free end of insulator 8. A metal sealing lip 9 of component has been elastically deformed by the installation of insulator 8. Because of the pre-loading resulting from the design of sealing lip 9, a sealing action is produced between the components. A cap nut 10 is provided for releasable coupling of the components. The gas flow of the machining gas, denoted by flow arrows 11, is used for reinforcing the sealing action. The dotted arrow indicates the exit direction of the laser beam from the laser cutting head.

What is claimed is:

1. An integrated sealing device of a laser machining head for sealing between a hollow cage member and a conduit of the laser machining head, the sealing device comprising:

an elastically deformable sealing lip of the hollow cage member extending integrally from a continuous and substantially planar portion of the hollow cage member; and a contact surface of the conduit, wherein the elastically deformable sealing lip of the hollow cage member extends toward the contact surface of the conduit so as to form an annular seal between the hollow cage member and the conduit, and the hollow cage member and the sealing lip are produced from a metal material.

2. The sealing device of claim 1, wherein the elastically deformable sealing lip projects beyond the substantially planar portion of the hollow cage member.

3. The sealing device of claim 1, wherein the hollow cage member defines an opening having an annular recess proximate the elastically deformable sealing lip.

4. The sealing device of claim 1, wherein the elastically deformable sealing lip is an annular contact surface or contact edge for the contact surface.

5. The sealing device of claim 1, wherein the conduit comprises a capacitively insulating material.

6. The sealing device of claim 5, wherein the conduit is produced from the capacitively insulating material.

7. The sealing device of claim 5, wherein the capacitively insulating material is a ceramic.

8. The sealing device of claim 5, wherein the capacitively insulating material is a plastic.

9. The sealing device of claim 1, wherein the sealing device is resealable.

10. The sealing device of claim 1, wherein the hollow cage member and the sealing lip are produced integrally from the metal material.

11. A sealing method for sealing a hollow cage member and a conduit of a laser machining head, the method comprising the steps of:

(a) positioning the conduit relative to the hollow cage member, such that a through hole of the conduit and a through hole of the hollow cage member are substantially aligned, the hollow cage member having an elastically deformable annular portion extending integrally from a continuous and substantially planar portion of the hollow cage member toward a contact surface of the conduit, wherein the hollow cage member and the elastically deformable annular portion are produced from a metal material;

(b) contacting the elastically deformable annular portion of the hollow cage member with the contact surface of the conduit to form an annular contact area between the hollow cage member and the conduit; and (c) deforming the elastically deformable annular portion of the hollow cage member with the contact surface of the conduit to increase the annular contact area between the hollow cage member and the conduit and to form an annular seal between the hollow cage member and the conduit.

12. The sealing method of claim 11, wherein the hollow cage member and the elastically deformable annular portion are produced integrally from the metal material.

13. A laser machining head comprising:

a hollow cage member having an elastically deformable sealing lip extending integrally from a continuous and substantially planar portion of the hollow cage member; and a conduit having a contact surface, wherein the elastically deformable sealing lip of the hollow cage member extends toward the contact surface of the conduit so as to form an annular seal between the hollow cage member and the conduit, and the hollow cage member and the sealing lip are produced from a metal material.

14. The laser machining head of claim 13, wherein the hollow cage member defines an opening having an annular recess proximate the elastically deformable sealing lip.

15. The laser machining head of claim 13, wherein the elastically deformable sealing lip is an annular contact surface or contact edge for the contact surface.

16. The laser machining head of claim 13, wherein the annular seal formed between the hollow cage member and the conduit is releasable.

17. The laser machining head of claim 16, wherein the annular seal formed between the hollow cage member and the conduit is resealable.

18. The laser machining head of claim 13, further comprising a laser cutting nozzle coupled to the conduit.

19. The laser machining head of claim 13, further comprising a cap nut coupled to the hollow cage member.

20. The laser machining head of claim 13, wherein the hollow cage member and the sealing lip are produced integrally from the metal material.

* * * * *